(12) United States Patent
Verplanken

(10) Patent No.: US 9,626,232 B2
(45) Date of Patent: Apr. 18, 2017

(54) EVENT QUEUE MANAGEMENT

(71) Applicant: ARM LIMITED, Cambridge (GB)

(72) Inventor: Fabrice Jean Verplanken, Sheffield (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 14/807,062

(22) Filed: Jul. 23, 2015

(65) Prior Publication Data

US 2017/0024263 A1 Jan. 26, 2017

(51) Int. Cl.
*G06F 9/54* (2006.01)
(52) U.S. Cl.
CPC .............. *G06F 9/542* (2013.01); *G06F 9/546* (2013.01)
(58) Field of Classification Search
None
See application file for complete search history.

(56) References Cited

U.S. PATENT DOCUMENTS

| | | | | |
|---|---|---|---|---|
| 6,721,315 B1* | 4/2004 | Xiong | .................. | H04L 49/254 370/389 |
| 7,318,017 B2* | 1/2008 | Swoboda | ......... | G01R 31/31705 370/394 |
| 2003/0172220 A1* | 9/2003 | Hao | ........................ | H04L 43/16 710/305 |
| 2004/0139447 A1 | 7/2004 | Hope et al. | | |
| 2004/0153769 A1* | 8/2004 | Lee | ....................... | G06F 9/3842 714/20 |
| 2009/0083752 A1 | 3/2009 | Wu et al. | | |
| 2010/0211828 A1* | 8/2010 | Moyer | ................ | G06F 11/3636 714/45 |
| 2010/0250651 A1 | 9/2010 | Bi et al. | | |
| 2010/0257179 A1* | 10/2010 | Arrouye | ............ | G06F 17/30067 707/741 |
| 2011/0138400 A1 | 6/2011 | Chandler et al. | | |
| 2012/0066694 A1* | 3/2012 | Jennings | ................. | G06F 9/542 719/318 |
| 2015/0295841 A1* | 10/2015 | Neelisetty | ............... | H04L 47/56 370/328 |

OTHER PUBLICATIONS

UK Combined Search and Examination Report issued Dec. 1, 2016 in GB 1610825.0, 8 pages.

\* cited by examiner

*Primary Examiner* — Shih-Wei Kraft
(74) *Attorney, Agent, or Firm* — Nixon & Vanderhye P.C.

(57) ABSTRACT

Queue storage queues event entries from a hardware event detector that are to be communicated to a software event handler. An event register stores a most recently received event entry. A comparator compares a newly received event entry with the content of the event register and if a match occurs, then these event entries are merged by setting a merged entry bit and discarding the newly received event entry. When a non-matching event entry is received, then the unqueued event within the event register is stored into the queue storage. If the queue storage is empty, then the event register and the comparator are bypassed. When the queue storage becomes empty, then any currently unqueued event within the event register is stored into the queue storage. The event entries may be translation error event entries in a system which translates between virtual addresses and physical addresses.

14 Claims, 4 Drawing Sheets

EVENT QUEUE MANAGEMENT

BACKGROUND

This disclosure relates to the field of data processing systems. More particularly, this disclosure relates to data processing systems having an event queue for queuing event entries to be passed from a source to a destination.

It is known to provide queues for storing event entries to be passed between a source and a destination. Such queues may assist in dealing with mismatches in the rate at which event entries are generated by the source and the rate at which entries are consumed by the destination.

SUMMARY

Viewed from one aspect the present disclosure provides apparatus for processing data comprising:

queue storage to store a queue of event entries corresponding to notifications of events from a source to a destination;

a comparator to compare a received event entry with at least one previously received event entry to detect a match; and an event entry merging unit to merge said received event entry with said at least one previously received event entry when said match is detected.

Viewed from another aspect the present disclosure provides apparatus for processing data comprising:

queue means storing a queue of event entries corresponding to notifications of events from a source to a destination;

comparing means for comparing a received event entry with at least one preceding received event entry to detect a match; and event entry merging means for merging said received event entry with said at least one previously received event entry when said match is detected.

Viewed from a further aspect the present disclosure provides a method of processing data comprising:

storing a queue of event entries corresponding to notifications of events from a source to a destination;

comparing a received event entry with at least one preceding received event entry to detect a match; and merging said received event entry with said at least one previously received event entry when said match is detected.

The above, and other objects, features and advantages of this disclosure will be apparent from the following detailed description of illustrative embodiments which is to be read in connection with the accompanying drawings.

DESCRIPTION OF EXAMPLE EMBODIMENTS

Figure 1:
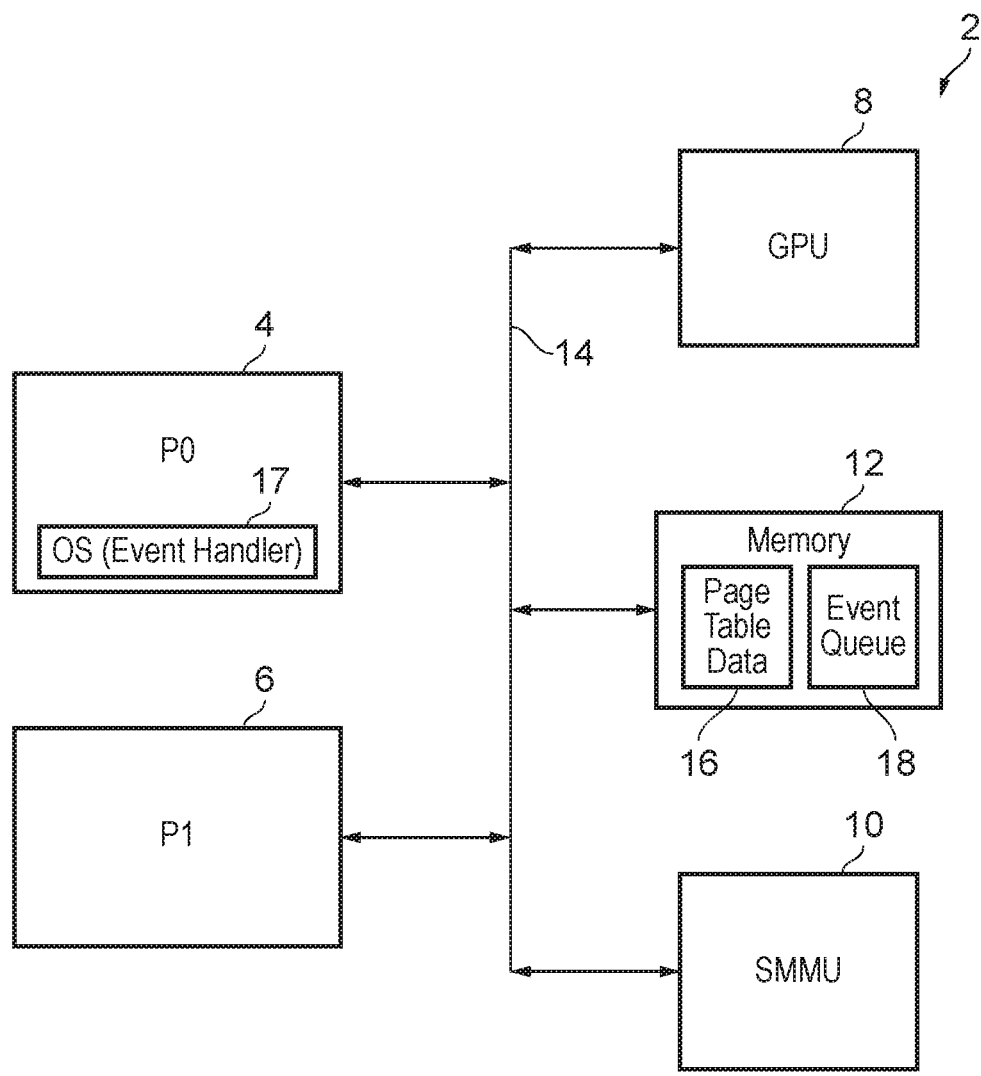
FIG. 1 schematically illustrates a data processing system including a source of event entries and a destination for those event entries.

FIG. 1 schematically illustrates a data processing system 2 comprising a first general purpose processor 4, a second general purpose processor 6, a graphics processing unit 8, a system memory management unit 10 and a shared memory 12 all connected via an interconnect 14. The system memory management unit 10 controls address translation (and access control parameters) between virtual addresses generated by one of the general purpose processors 4, 6 and graphics processing unit 8 and physical addresses as used to address the shared memory 12. A system memory management unit 10 utilizes translation data read from page table data 16 stored within the shared memory 12. The translation data may be read from the page table data 16 via a page table walking operation performed by operating system software 17 executed by the general purpose processor 4. When a memory access is generated for which the system memory management unit 10 does not contain the translation data needed to perform the virtual address to physical address translation, the system memory management unit 10 generates an event entry (translation data error event) which is stored within an event queue 18 held in the shared memos 12. The system memory management unit 10 is accordingly a source of event entries. These event entries are communicated to the general purpose processor 4, and in particular to the operating system software 17, which controls/performs the appropriate page table walk through the page table data 16 in order to recover the appropriate translation data on behalf of the system memory management unit 10. This recovered translation data is then stored within the system memory management unit 10, or elsewhere within the data processing system 2, where it is used to perform a desired translation. The operating system software 16 is a destination for communication of event entries from the event queue 18.

In this example hardware, the event entries are generated by the system memory management unit 10 serving as a hardware event detector. The operating system 17 consumes the event entries and serves as a software event handler. The event entries in this example embodiment include the above described translation error events indicating occurrence of an address translation error. Other forms of event may also be generated by the system memory management unit 10 and stored within the event queue 18 for processing by the operating system software 17. In the case of a translation error event entry, this may include error address data indicating the address of an attempted access corresponding to the address translation error. Accordingly, the error address data may indicate a page within the virtual address memory space for which translation data is not currently held by the system memory management unit 10 and which needs to be recovered from the page table data 16. As the system memory management unit 10 is a hardware entity it may generate a relatively large number of translation error event entries in a short period of time compared to the time required by the operating system software 17 to consume those translation error event entries from the event queue 18 and perform the associated page table walking to resolve those translation error event entries. This is particularly the case as the processing performed by the data processing system 2 progresses it may start to access an area of virtual memory address space that was previously un-accessed and in a short period of time perform multiple accesses to that new area of the virtual memory address space leading to generation of a burst of translation error event entries that requiring queuing before they can be handled by the operating system software 17. Mixed in with these bursts of translation error event entries may be one or more different event entries which should not be lost and accordingly need to be preserved within the event queue 18. Accordingly, the event queue 18 needs to be arranged to have sufficient capacity to store received event entries without overflowing in a manner which could precipitate a stall in the processing by the data processing system 2. If the event queue 18 overflowed, then it may in some embodiments be necessary to stall the operation of the data processing system 2 in order that critical event entries would not be lost. It is also possible that in some embodiments, overflow could be tolerated with processing continuing.

The desire not to overflow the event queue 18 may lead to a requirement to provide a high capacity event queue 18. Such a high capacity event queue would consume a disadvantageous amount of space within the shared memory 12. Furthermore, reading and writing of a large number event entries from and to such an event queue 18 would consume a potentially disadvantageous amount of energy. The event queue 18 serves as a first-in-first-out (FIFO) memory and may be implemented, for example, as a ring buffer within the general purpose shared memory 12. Such a ring buffer has a defined area within the shared memory 12 and utilizes a read pointer and a write pointer which wrap within that defined area of the shared memory 12 set aside to form the ring buffer. Other forms of buffers may also serve to provide queue storage.

Figure 2:
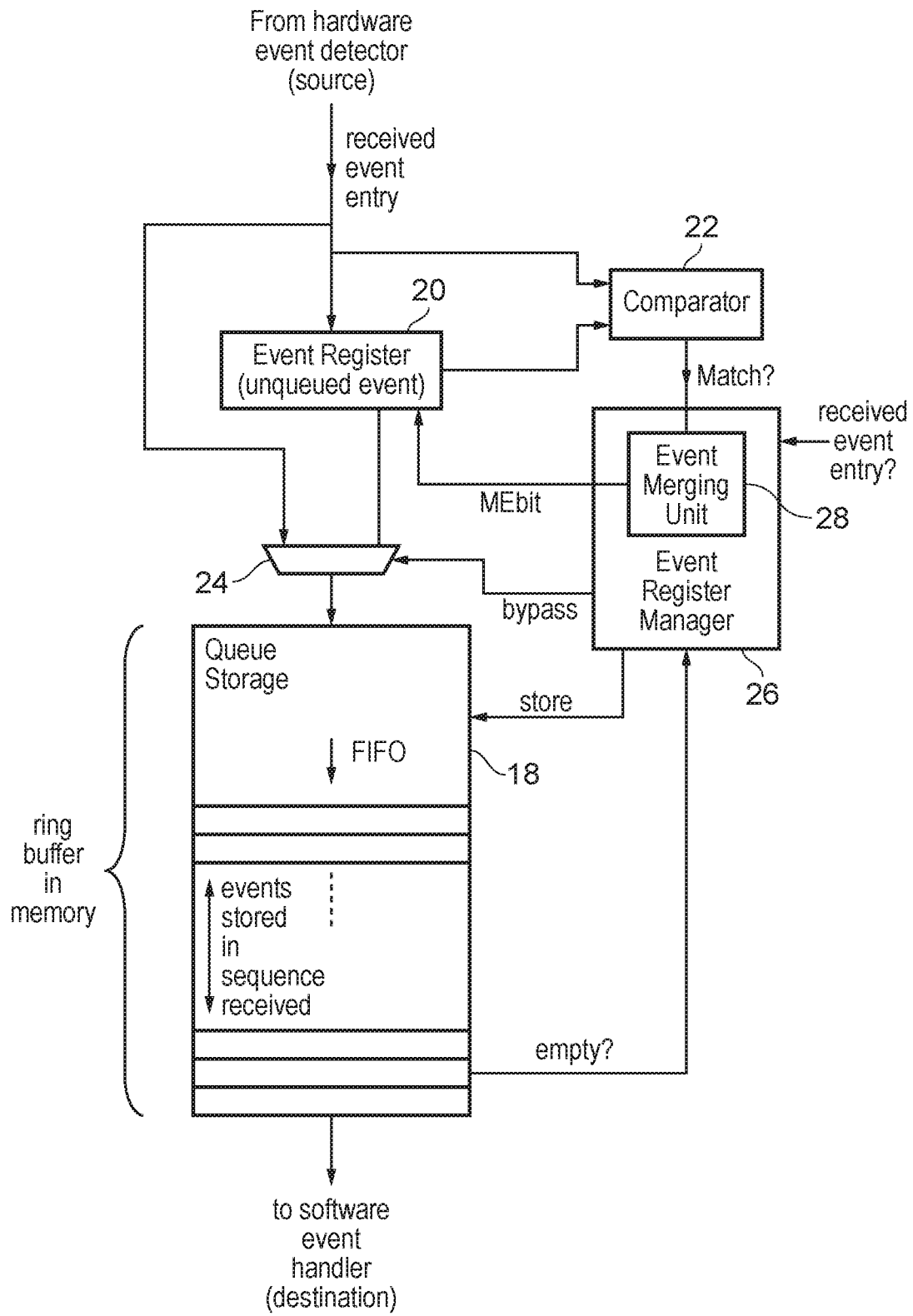
FIG. 2 schematically illustrates an event entry queue.

FIG. 2 schematically illustrates an example event queue of a form which may be utilized in the system of FIG. 1. In particular, this event queue serves to communicate event entries between a hardware event detector (source) in the form of the system memory management unit 10 and a software event handler (destination) in the form of the operating system software 17. Queue storage 18 is provided, in this example embodiment, in the form of a ring buffer held within the shared memory 12. This ring buffer is controlled to serve as a first-in-first-out (FIFO) memory in which the event entries are stored in the sequence in which they are received from the hardware event detector. The event entries are read by the software event handler from the queue storage 18 following the sequence in which the event entries were received.

At an input end of the queue storage 18 are provided mechanisms for merging received event entries in a manner which enables more efficient utilization of the storage resources of the queue storage 18. A received event entry is supplied to an event register 20, a comparator 22 and one input of a bypass multiplexer 24. If the queue storage 18 is empty (i.e. currently storing fewer than one event entry), then an event register manager 26 serves to switch the bypass multiplexer 24 such that the received event entry is passed directly into the queue storage 18. This has the result that the newly received event entry becomes available to be read by the software event handler 17 more rapidly than if it was subject to additional processing or delay before reaching the queue storage 18. If the queue storage 18 is not empty, then the bypass multiplexer 24 is switched by the event register manager 26 to receive its input from an event register 20. The event register 20 serves to store an unqueued event which is temporarily held in the event register 20 before being stored into the queue storage 18. If the event register 20 is currently empty, then the received event entry is directly stored into the event register 20 under control of the event register manager 26. If the event register 20 is already storing an unqueued event and a new event entry is received, then the comparator 22 serves to compare the received event entry with the unqueued event entry. If these match, then this is indicated to an event merging unit 28. Whether or not a received event entry and an unqueued event entry match can be judged in a variety of different ways depending upon the nature of those entries. If those entries are ones relating to translation errors, then a match may be identified if the error address data of a received translation error event corresponds to the same page of translation data which is to be recovered in response to the unqueued translation error event stored within the event register 20. Thus, if a burst of virtual address accesses occur to the same page of memory for which address translation data is not already held by the system memory management unit 10, those multiple translation table data misses can be identified by the comparator 22 as matching and the translation error events concerned may be merged by the event merging unit 28. In practice the event merging unit 28 may merge events by discarding the second and subsequent event entries received which match the unqueued event 20 already held within the event register 20 and setting a merged entry bit (ME bit) within the event entry so as to indicate that it is representing multiple such matching event entries. This merged status may be useful in subsequent diagnostic processing as indicating that a burst of translation errors occurred.

If the comparator 22 does not indicate a match between the received event entry and the unqueued event, then the unqueued event from the event register 20 is stored into the queue storage 18 and the received event entry is then stored into the event register 20. These actions are controlled by the event register manager 26.

The event register manager 26 may also serve to store an unqueued event from the event register 20 into the queue storage 18 when the number of event entries stored within the queue storage 18 falls below a threshold number of event entries. As an example, should this threshold number be one, then, when the queue storage 18 becomes empty, an unqueued event stored within the event register 20 will be stored into the queue storage 18 under control of the event register manager 26 so that it becomes available to be read by the software event handler 17. This threshold number could be more than one in some embodiments.

The action of the comparator 22, the event register 20, the event register manager 26 and the event merging unit 28 is to compare a received event entry with an immediately preceding event entry within the sequence of event entries from the hardware event detector. This immediately preceding event entry is stored within the event register 20 (assuming that the queue storage 18 is not empty and the event register 20 has not been bypassed). The comparator 22 is thus able to perform a relatively constrained comparison between the received event entry and a single unqueued event entry. If a match occurs, then the event merging unit 28 merges these events prior to them being added to queue storage 18. Thus, bursts of uninterrupted matching event entries are merged before they reach the queue storage 18 thereby saving storage capacity within a queue storage 18. Furthermore, energy is saved due to avoiding unnecessary reads and writes to the queue storage 18. In practice bursts of matching event entries are relatively common in real life operation in a data processing system such as that illustrated in FIG. 1. Thus, the additional hardware required to identify such matching entries and generating merged entries is justified by the resource and energy savings made.

In other example embodiments a comparison between a received event entry and a plurality of previously received event entries may be made, e.g. a system may include multiple event sources (CPU, GPU, . . . ) and entries capable of merging may be received in an interleaved manner, but can be identified by comparing with several previously received entries.

Figure 3:
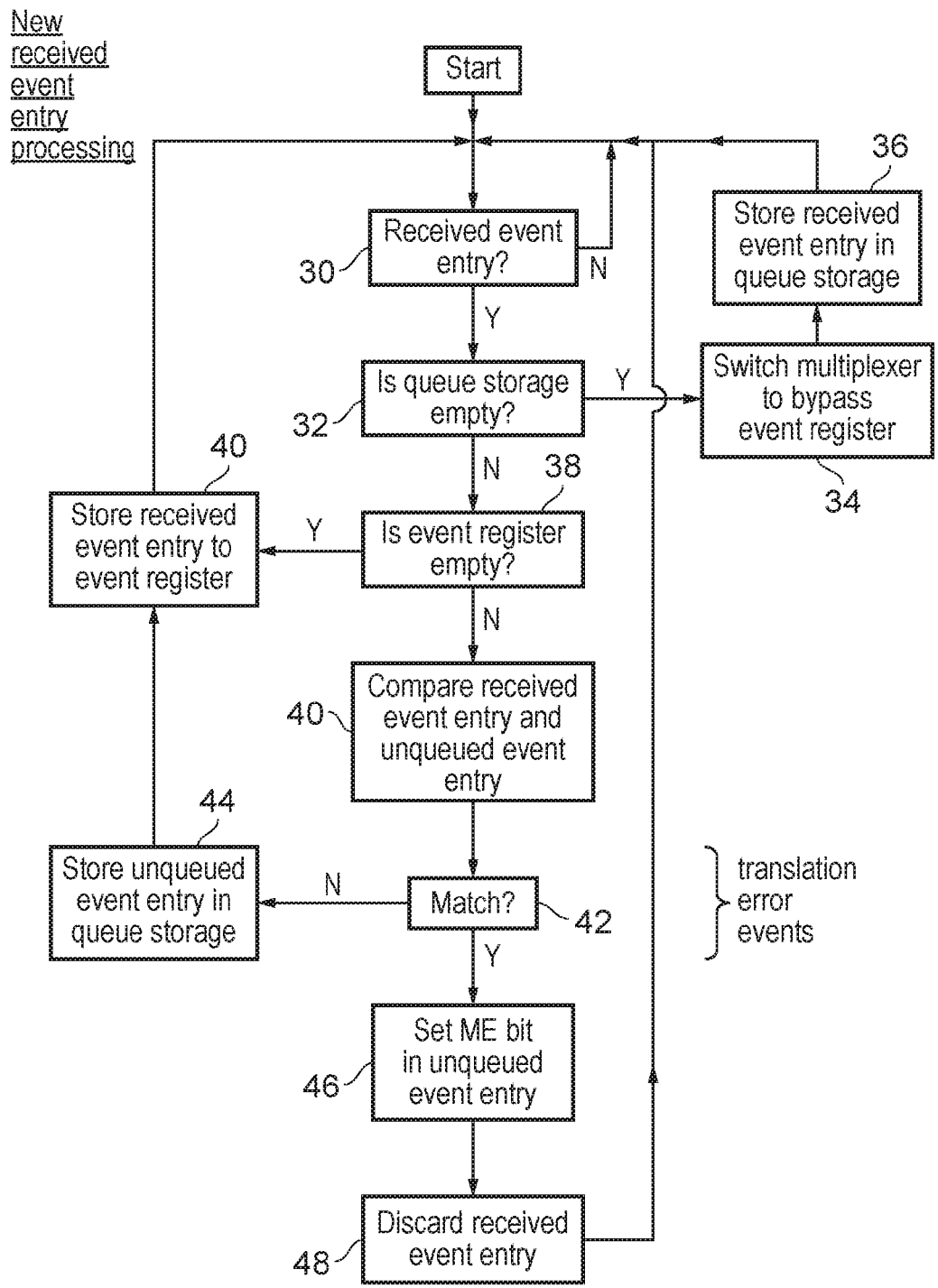
FIG. 3 is a flow diagram schematically illustrating the operation of the event entry queue of FIG. 2 when event entry is received.

FIG. 3 is a flow diagram schematically illustrating processing performed when a new received event entry arises. At step 30 processing waits until a new received event entry arises. Step 32 then determines whether the queue storage 18 is currently empty. If the queue storage 18 is currently empty, then step 32 controls the bypass multiplexer to bypass the event register 20 at step 34 and step 36 stores the received event entry into the queue storage 18 before processing returns to step 30.

If the queue storage is not empty, then step 38 serves to determine whether the event register 20 is empty. If the event register 20 is currently empty, then processing proceeds to step 40 where the received event entry is stored into the event register and processing is again returned to step 30. If the event register 20 is not empty, then step 40 serves to compare the received event entry and the queued event entry. As previously discussed, this comparison could take a variety of different forms depending upon the nature of the event entries that are being merged. In the case of translation error event entries, the comparison could be based upon whether those entries relate to a requirement to access the same page of page table data in order to resolve the translation error. Other forms of entries may also be identified as matching, e.g. entries which report the same fault of a type different from an address translation error. Step 42 determines whether the comparison of step 40 indicates a match. If there is no match, then step 44 serves to store the unqueued event entry in the event register 20 into the queue storage 18 and processing proceeds to step 40 where the received event entry is stored into the event register 20. If there is a match, then step 46 serves to set the merged entry bit (ME bit) in the unqueued event entry stored within the event register 20. This merged entry bit may already be set if the unqueued event entry is already representing a merged entry. Step 48 then discards the received event entry and processing returns to step 30.

Figure 4:
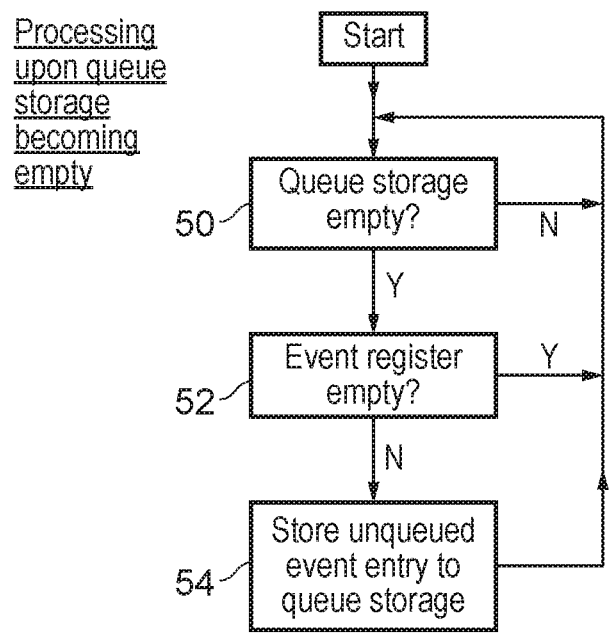
FIG. 4 is a flow diagram schematically illustrating operation of the queue upon queue storage becoming empty.

FIG. 4 is a flow diagram schematically illustrating processing performed when the queue storage 18 becomes empty. At step 50 processing waits until the queue storage is detected as having become empty. When the queue storage 18 is detected as having become empty, then step 52 determines whether the event register is currently empty. If the event register 20 is currently empty, then processing returns to step 50. If the event register 20 is not empty, then step 54 serves to store the unqueued event entry currently held within the event register 20 into the queue storage 18 before processing again returns to step 50.

Figure 5:
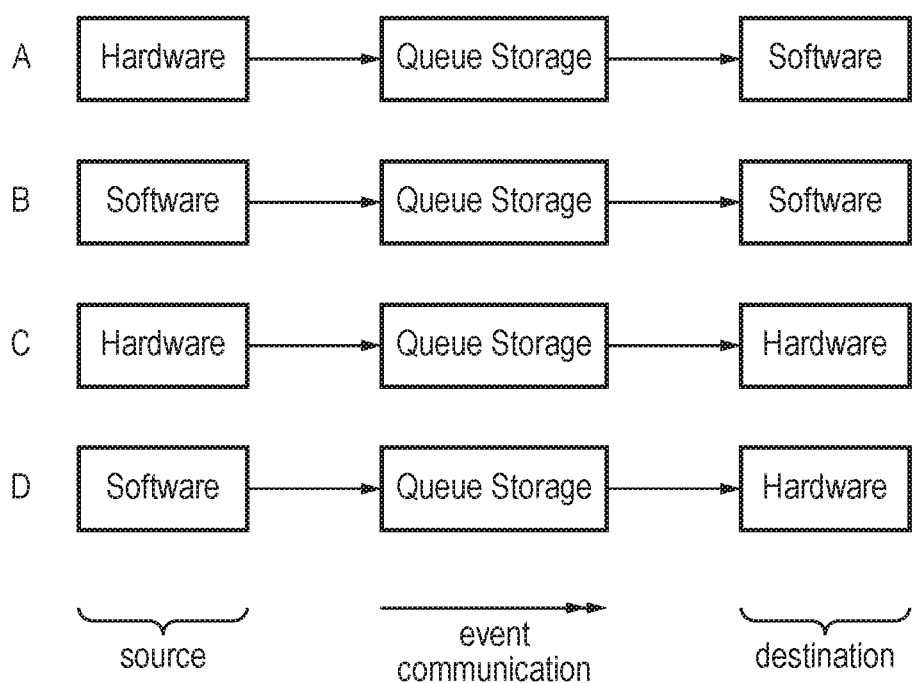
FIG. 5 schematically illustrates a plurality of different types of embodiment to which the present disclosure may be applied.

The above described example embodiment utilizes a hardware source of event entries in the form of a hardware event detector and a software destination for event entries in the form of a software event handler 17 (operating system software). It will be appreciated that other forms of event sources and event destinations are possible between which queue storage is used. The present techniques may be employed in these different embodiments as a way of enhancing the operation of the queue storage 18. In particular, the source of event entries may be a hardware source or a software source. Furthermore, the destination of event entries may be a hardware destination or a software destination. These possibilities are illustrated in FIG. 5. The example embodiment illustrated in FIG. 2 employs hardware based event queue management circuits such as the event register manager 26, the event merging unit 28, the comparator 22, the event register 20 and the bypass multiplexer 24. It will be appreciated that in other example embodiments, one or more of these elements may be provided by software executing on a general purpose processor, such as the general purpose processors 4, 6. Such other example embodiments are encompassed within the present disclosure.

The above described example embodiment concerns the merging of address translation errors. The present techniques are applicable more widely and to many other example embodiments. In some example embodiments a single source may produce similar events to be communicated to a destination, e.g. address translation logic. The merging mechanisms are exposed to whatever translations are requested by the upstream master, and since the master is implemented in a simple sequential structure (i.e. does not remember anything about transaction N when it starts working on transaction N+1), it may end up generating bursts of similar 'translation fault' events.

In other example embodiments multiple sources may produce similar events to be communicated to a destination, e.g. low-level management functions in a networking system. Such examples include multiple-port switches or routers where each port may want to signal some type of event to a centralized, software-driven, board/system management controller ('BMC') via a single queue, e.g. network ports supporting the Wake-on-LAN feature, whereby the port interface is woken-up by so-called 'Magic Packets' received from the link. The actual wake-up function may be implemented in hardware, but each port may also want to notify the BMC, which in turn can take care of some centralized resource (e.g. take some centralized DRAM out of hibernation if all ports were sleeping). If "Magic Packets" are received simultaneously by several ports, the same type of events would be sent to the BMC Queue, and they could be merged using the present techniques since their effects would be the same. Other examples include the field of industrial automation and other systems in which multiple sources send similar events to a single destination through a queue-based interface.

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

I claim:

1. Apparatus for processing data comprising:
   queue storage to store a queue of event entries corresponding to notifications of events from a source to a destination;
   a comparator to compare a received event entry with at least one previously received event entry to detect a match; and
   event entry merging circuitry to merge said received event entry with said at least one previously received event entry in response to said comparator detecting said match; and
   wherein:
   said event entries include a translation error event entry indicating occurrence of an address translation error;
   said address translation error corresponds to a translation table data miss and said translation error event entry triggers said destination to perform a page table data walk to a page of translation data within page table data corresponding to said translation table data miss;

said translation error event entry includes error address data indicative of an address of an attempted access corresponding to said address translation error;

said comparator is configured to compare error address data of received translation error event entries to detect said received translation error event entries corresponding to a same page of translation data within said page table data; and said event entry merging circuitry is configured to merge received translation error event entries having matching error address data.

2. Apparatus as claimed in claim 1, wherein said comparator compares said received event entry with an immediately preceding received event entry.

3. Apparatus as claimed in claim 2, comprising an event register to store an unqueued event entry yet to be added to said queue stored in said queue storage.

4. Apparatus as claimed in claim 3, wherein said comparator compares said received event entry with said unqueued event entry stored in said event register.

5. Apparatus as claimed in claim 4, comprising an event register manager to add said unqueued event entry stored in said event register to said queue storage in said queue store, and to store said received event entry in said event register to serve as a new unqueued event entry in response to said comparator not detecting said match.

6. Apparatus as claimed in claim 4, comprising an event register manager to mark said unqueued event entry as a merged unqueued event entry in response to said comparator detecting said match.

7. Apparatus as claimed in claim 3, comprising an event register manager to add said unqueued event entry to said queue storage in said queue store in response to said event register manager detecting said queue stored in said queue storage comprises fewer than a threshold number of event entries.

8. Apparatus as claimed in claim 7, wherein said threshold number is one.

9. Apparatus as claimed in claim 1, wherein said queue of event entries is a communication queue to communicate occurrence of events from said source to said destination.

10. Apparatus as claimed in claim 1, wherein said source is a hardware event detector.

11. Apparatus as claimed in claim 1, wherein said destination is a software event handler.

12. Apparatus as claimed in claim 1, wherein said comparator compares a portion of said error address data identifying a corresponding page table entry within said page table data.

13. Apparatus for processing data comprising:

queue means storing a queue of event entries corresponding to notifications of events from a source to a destination;

comparing means for comparing a received event entry with at least one preceding received event entry to detect a match; and event entry merging means for merging said received event entry with said at least one previously received event entry when said match is detected;

wherein said event entries include a translation error event entry indicating occurrence of an address translation error;

said address translation error corresponds to a translation table data miss and said translation error event entry triggers said destination to perform a page table data walk to a page of translation data within page table data corresponding to said translation table data miss;

said translation error event entry includes error address data indicative of an address of an attempted access corresponding to said address translation error;

said comparing means is configured to compare error address data of received translation error event entries to detect said received translation error event entries corresponding to a same page of translation data within said page table data; and said event entry merging means is configured to merge received translation error event entries having matching error address data.

14. A method of processing data comprising:

storing a queue of event entries corresponding to notifications of events from a source to a destination;

comparing a received event entry with at least one preceding received event entry to detect a match; and merging said received event entry with said at least one previously received event entry when said match is detected;

wherein said event entries include a translation error event entry indicating occurrence of an address translation error;

said address translation error corresponds to a translation table data miss and said translation error event entry triggers said destination to perform a page table data walk to a page of translation data within page table data corresponding to said translation table data miss;

said translation error event entry includes error address data indicative of an address of an attempted access corresponding to said address translation error;

said comparing includes comparing error address data of received translation error event entries to detect said received translation error event entries corresponding to a same page of translation data within said page table data; and said merging includes merging received translation error event entries having matching error address data.

* * * * *